United States Patent
Moschetti

(10) Patent No.: US 6,687,301 B2
(45) Date of Patent: Feb. 3, 2004

(54) METHOD FOR BLOCK MATCHING MOTION ESTIMATION IN DIGITAL VIDEO SEQUENCES

(76) Inventor: Fulvio Moschetti, Av. de Morges 88, Lausanne (CH), CH-1004

(*) Notice: Subject to any disclaimer, the term of this patent is extended or adjusted under 35 U.S.C. 154(b) by 486 days.

(21) Appl. No.: 09/810,544

(22) Filed: Mar. 19, 2001

(65) Prior Publication Data

US 2002/0163968 A1 Nov. 7, 2002

(51) Int. Cl.$^7$ .................. H04N 7/12; H04N 11/04
(52) U.S. Cl. .................. 375/240.16; 375/240.12; 375/240.21; 375/240.24
(58) Field of Search .................. 375/240, 240.16, 375/240.12, 240.21, 240.24

(56) References Cited

U.S. PATENT DOCUMENTS

| | | | | |
|---|---|---|---|---|
| 5,151,784 A | * | 9/1992 | Lavagetto | 358/136 |
| 6,285,711 B1 | * | 9/2001 | Ratakonda et al. | 375/240.16 |
| 6,377,623 B1 | * | 4/2002 | Ra et al. | 375/240 |
| 6,380,986 B1 | * | 4/2002 | Minami | 348/699 |
| 6,424,676 B1 | * | 7/2002 | Kono et al. | 375/240.16 |
| 6,430,223 B1 | * | 8/2002 | Lim | 375/240.16 |
| 6,456,659 B1 | * | 9/2002 | Zuccaro | 375/240.16 |
| 6,483,928 B1 | * | 11/2002 | Bagni | 382/102 |
| 6,493,390 B2 | * | 12/2002 | Miyaji | 375/240.16 |
| 6,567,469 B1 | * | 5/2003 | Rackett | 375/240.16 |

* cited by examiner

*Primary Examiner*—Andy Rao
*Assistant Examiner*—Charles E Parsons
(74) *Attorney, Agent, or Firm*—Young & Thompson

(57) ABSTRACT

An encoder and method of block matching motion estimation includes accepting a current frame image and a reference image frame; dividing the frames into blocks; for each block of the current frame, searching the reference frame for a corresponding block; calculating a motion vector representing a position difference between the blocks; determining a mean motion vector for one block of the reference frame; establishing a search window; determining a mean absolute difference of the motion vector of the one block; determining a target probability of finding a minimum of the mean absolute difference searching within the search area and outside the search area; and locating the minimum of the mean absolute difference and outputting from the encoder a displacement estimation signal.

10 Claims, 4 Drawing Sheets

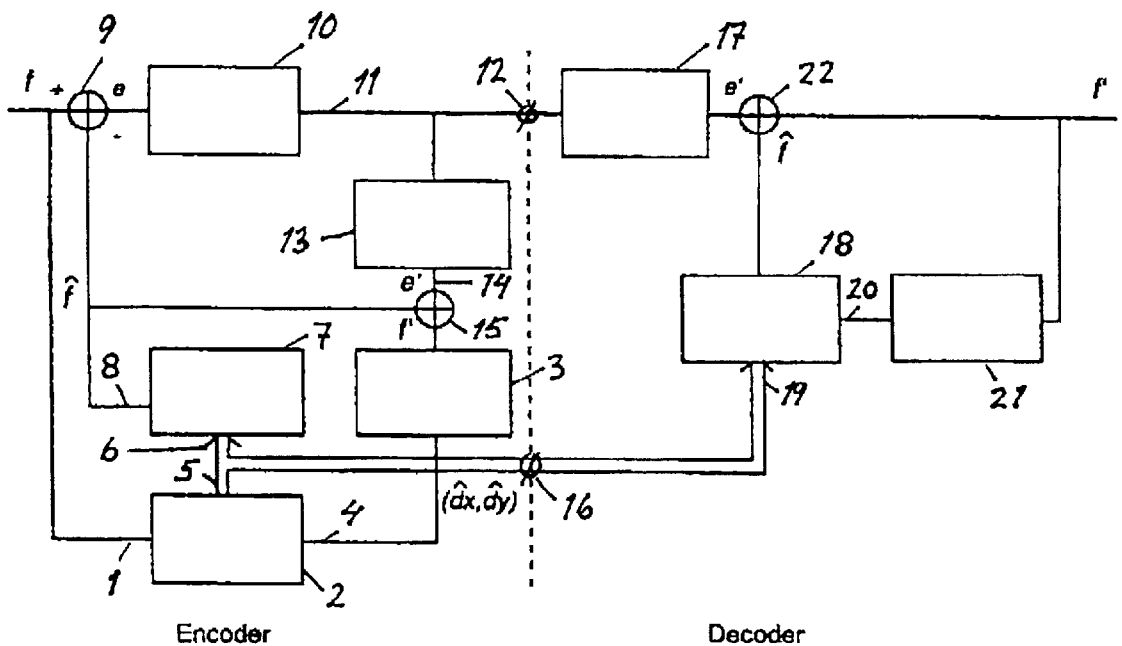
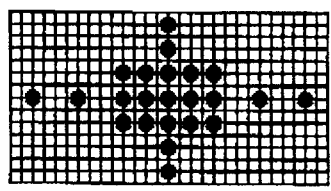
a
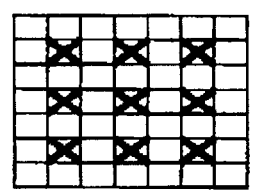
b
FIG 3
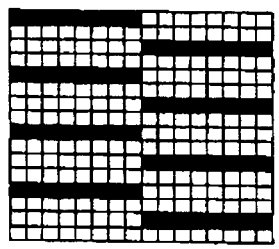
FIG 4

|  | Fsa | Ntss | Tss | Fss | Ucbds | SSA | SSAP1 |
|---|---|---|---|---|---|---|---|
| Basket | 30.46 | 28.53 | 28.92 | 28.53 | 28.37 | 30.16 | 29.9 |
| Flower Garden | 30.18 | 28.45 | 28.32 | 28.52 | 28.43 | 29.91 | 29.56 |
| Barca | 34.28 | 31.90 | 32.68 | 33.85 | 33.84 | 34.23 | 34.04 |
| Stefan | 32.01 | 29.82 | 29.91 | 29.29 | 29.24 | 31.3 | 31.17 |
| Coastguard | 33.93 | 33.83 | 33.84 | 33.57 | 33.50 | 33.92 | 33.85 |
| Akiyo | 45.15 | 45.15 | 45.13 | 45.15 | 45.15 | 45.15 | 45.14 |

FIG 7

METHOD FOR BLOCK MATCHING MOTION ESTIMATION IN DIGITAL VIDEO SEQUENCES

TECHNICAL FIELD

This invention relates to methods for block matching motion estimation in digital video sequences.

BACKGROUND ART

Research on digital video communication has received continuously increasing interest over the last decade. Some of this work converged into robust standards successfully set on the market, (MPEG1 and MPEG2; H.261 and H.263), and a new very powerful multimedia standard (MPEG4), that is mainly based on the idea of second generation video coding. However higher bandwidth availability in the communication channels, e-commerce applications over the web and the video e-mail will certainly open new horizons for digital video.

Even though it is possible today to execute an MPEG playback in real time over most of the personal computers available, the situation worsens considerably when we consider the video encoding. It is computationally so demanding that it becomes simply impossible to find encoders able to work in real time, with a decent quality, without specific added hardware.

It is well known that the main computational bottleneck, in an MPEG encoder, is the motion estimation. The latter, used in the MPEG syntax to exploit the temporal redundancy in the video sequences, is based on the so called block matching technique.

The explicit use of motion compensation to improve video compression efficiency is widely adopted. Although detailed implementation of motion compensated systems varied significantly over the past 25 years, the general concept remains unchanged. In a video encoding system, the velocity of an object between two frames is estimated and used to predict the location of the object in a succeeding frame. Differential encoding between this prediction and the actual succeeding frame are used to update the prediction at the receiver. As only the velocity and updating difference information need be transmitted, this provides a reduction in the communication channel capacity required for video transmission.

BRIEF DESCRIPTION OF THE INVENTION

A new block matching algorithm for the motion estimation in general MPEG sequences is provided. The algorithm according to the invention reduces the number of points to be checked in the search window compared to the full search algorithm (fsa) by exploiting a statistically modelled pattern. Thus, the algorithm adapts the search strategy according to the evolution of the sequence, so according to their properties a variable number of points will be checked in the search window. This statistical adapting behaviour allows a better performance for the algorithm, adjusting the search to the complexity of the sequences and their evolution. The behaviour of the MAD (Mean Absolute Difference, formula 1, page 7) in the search window is in fact far to be monomodal in the general case, and in complicated sequences in particular.

A subsampling pattern for the macroblock (e.g. 16×16 pixels) is also proposed according to the invention. It allows a further reduction in the number of operations needed for the match and a considerable improvement for SIMD (Single Instruction Multiple Data) architectures. The impact on the overall coding quality is very limited.

Thus, one object of the present invention is to provide a motion estimation algorithm to be used for digital video coding. The algorithm is decreasing the number of operations to carry out compared to the exhaustive search (full search algorithm) still keeping a quality which is close to what can be achieved by the full search algorithm and in any case better than what is provided by known non-exhaustive algorithms.

The invention is characterised according to the appended claims.

BRIEF DESCRIPTION OF THE FIGURES

Other objects, uses and advantages of this invention will be apparent from the reading of this description which proceeds with reference to the accompanying drawings forming part thereof and wherein:

FIG. 1 shows a general motion compensated coding and decoding structure,

FIG. 3 shows a general search window, FIG. 4 shows a subsampling pattern according to the invention, FIG. 7 shows the quality results for the different standard sequences in table form.

DETAILED DESCRIPTION OF THE INVENTION

Figure 2:
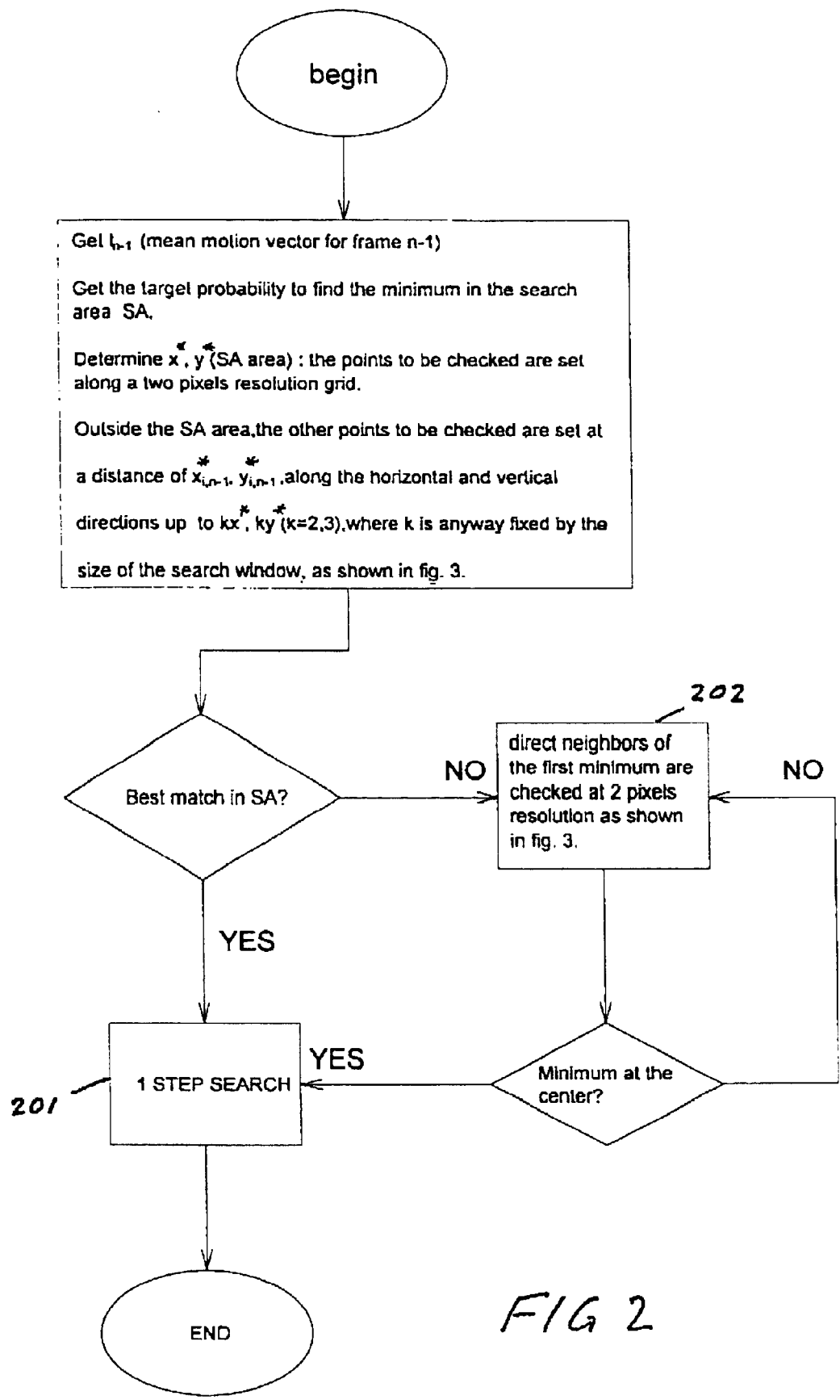
FIG. 2 shows a flowchart of the SSA (Statistical Search Algorithm) according to the invention.

The general structure of a motion-compensated codec is shown in FIG. 1. For the moving areas of an image, there are roughly three processing stages at the encoder: motion parameter estimation, moving pels prediction (motion compensation), and prediction-errors/original-pels compression. Only two stages are needed at the decoder: prediction-errors/original-pels decompression, and motion compensation.

In these processes, the motion compensators at the encoder and decoder sides are similar. They often consist of two operations: access to the previous-frame image data according to the estimated displacement vectors, and construct the predicted pels by passing the previous frame image through the prediction filter. The data compression and decompression processes are inverse operations of each other. The most popular image data compression procedure uses discrete transforms, coefficient selection quantization, and variable word length coding.

FIG. 1 shows a general motion compensated coding structure with an encoder part to the left and a decoder part to the right of the dotted line. This structure is in principle known from the prior art. In the following description most of the emphasis will be put on the encoder part more precisely on the displacement estimator 2.

The signal f represents the original image or frame at the video input of the encoder which image is to be encoded for transmission. This signal is fed to a first input 1 of a displacement estimator 2 which will carry out a motion estimation. We assume in the following that frame number n has been received in this way by the displacement estimator 2. As the coding is motion compensated we need a prediction from a previously stored image, i.e. the frame number n−1. This image has been stored in a memory in the coded frame block 3. From this block the previous coded image is fed to a second input 4 on said displacement estimator 2. From these two input signals a displacement estimation is now calculated. On its output 5 connected to the input 6 on the motion compensated predictor 7 the displacement estimator 2 is delivering the motion vectors. The motion compensated predictor 7 delivers on its output 8 a prediction of the image f^ which is fed to the negative input of the subtractor 9. To the positive input of said subtractor the original image is fed. This means that the signal e at the output from this subtractor represents the error between the original image f and the predicted image f^. This error is then coded in the intraframe source encoder 10 and fed from the output 11 to a first output 12 of the encoder. The same signal from the output 11 is also fed to the intraframe source decoder 13. This block decodes the error signal and delivers the signal e' on its output 14 connected to the adder 15. The added signal from the decoded error and the predicted image is then stored in the memory in the coded frame block 3.

The output 5 from the displacement estimator 2 is also connected to a second output 16 from the encoder. So what is actually transmitted to the decoder are the motion vectors on output 16 and the error on the output 12.

On the decoder side the error signal will be decoded in the intraframe source decoder 17 to deliver on its output the signal e'. A motion compensated predictor 18 connected to the output 16 from the encoder will receive the motion vectors on a first input 19 and information about the previous decoded frame from the block 21 on a second input 20. From these input signals a prediction of the image f^ is calculated. The signals e' and f^ are added in the adder 22 to give a signal representing the decoded image f^.

For the rest of this description we will leave the decoder part out. The invention is related to the particular implementation of the displacement estimator 2 of the encoder. This block as most of the other blocks referred to above could be implemented in hardware or software or a combination of hardware and software.

Thus, the displacement estimator 2 of FIG. 1 has two inputs 1 and 4. On input 1 is received the original image f and on the input 4 is received the previous coded frame.

Motion Estimation-Block Matching Technique

According to the motion estimation-block matching technique the image is divided into blocks of a general rectangular shape. In practical applications these are squares of dimensions N×N pixels. For each block in the current frame the block of pixels in a reference frame that is the most similar, according to a particular criterion, is searched. The position difference between the current block and the block that turns out to be the most similar in the reference frame represents the motion vector v, given by:

$$v = \min_{\substack{|d1|<sxMax \\ |d2|<syMax}} \frac{1}{N^2} \sum_{n1=0}^{N-1} \sum_{n2=0}^{N-1} \|y(n_1, n_2, t) - y(n_1 - d_1, n_2 - d_2, t - \Delta\tau)\| \quad (1)$$

where y represents the luminance component of the current frame at the time t and at the time t−Δτ; and Δτ represents the time interval between the current and the reference frame. In the case of the MPEG encoding Δτ could in fact be also a negative value because of the backward prediction of the B frames (MPEG 1–2) or B VOP(MPEG4). The values d1 and d2 represent the horizontal and vertical displacement of the block in the reference frame and must be valid values within a certain area in which the best match is sought. This area is generally called the search window. The argument of the sum in equation (1) is a norm. This can be an L2 or an L1 norm called respectively MSE (Mean Squared Error) or MAD (Mean Absolute Difference). In terms of the goodness of the estimation, they give similar results, whilst from a computational point of view L1 norm is more efficient, as it doesn't require an extra multiplication. Since we are interested in fast solutions, just the MAD will be considered in the following.

Motion Vector and Noise Distribution

The study and modelling of the motion vectors field assume a fundamental role both in the coding process and in the determination of the motion of objects in video sequences. This aspect plays an even more important role in the framework of second-generation video coding, where semantically meaning objects can be extracted from the scene and then coded and transmitted independently. The need for a model of the motion vector field requires an approach that should be as much general as possible; an investigation that should be comprehensive of the case of both segmented and independently coded objects, where the motion vector field has a higher temporal and spatial coherence, and the case of traditional frame coding. So in the general case we can start considering a rigid object moving through the scene. Let M be the number of Macroblocks (MBs), each MB being a 16×16 pixels block, covering this object and $v_i$ the motion vector of the $MB_i$. The mean motion vector of the object is given by:

$$m = \frac{1}{M} \sum_{i=1}^{M} v_i$$

If we want then to characterise each vector of the motion field on the basis of the mean vector just introduced, (mean vector that, apart from limit situations such as zoomings, generally represents the dominant vector), then we'll have that $$v_i = m + n_i.$$

The vector $n_i$ can be considered as a noise vector introduced to represent the inaccuracies due to the block matching technique. Now with this formulation we can say that the properties of the statistical distribution of $v_i$ is that of $n_i$.

Let us introduce then $p_n(n_i)$ as the probability density function of the n-vectors. The statistical characteristics, the shape and the region of support of this function will represent the information about the area where the search of the minimum of the MAD is going to happen and about the effective possibility to find this minimum around the area pointed at by m. The aim is therefore to reach the best matching point with the least number of attempts, having anyway an estimation about the probability to find it around the starting point.

To this extent the following model for $p_n(n_i)$ has been introduced:

$$p_n(n_i) = \frac{c}{2\sigma\Gamma\left(\frac{1}{c}\right)} \sqrt{\frac{\Gamma\left(\frac{3}{c}\right)}{\Gamma\left(\frac{1}{c}\right)}} \exp\left\{-\left[\sqrt{\frac{\Gamma\left(\frac{3}{c}\right)}{\Gamma\left(\frac{1}{c}\right)}} * \frac{|(x-\mu)|}{\sigma}\right]^c\right\} \quad (2)$$

with $\mu$ and $\sigma$ being the mean and the standard deviation of $n_i$ distribution. The model is that of a generalised Gaussian distribution (ggd). The main property of the ggd is that it spans from the Laplacian to the Gaussian distribution with the parameter q assuming respectively the values 1 or 2. The ggd can also tend towards a uniform distribution when the parameter $c \to \infty$.

Since the ggd is a parametric distribution, particular attention must be given to the selection of the parameter that optimises the model. Experimental results have shown that the distribution model varies with values of c comprised in an interval [0.5, 2], according to the complexity of the scene.

The Statistical Search Algorithm (SSA) According to the Invention

The algorithm according to the invention exploits the previous results to reach the minimum of the MAD within the search window. This is achieved by distributing the points to be checked according to the variance of the distribution. Let us consider the mean motion vector $m_{n-1}$ of an object in frame n−1, as given by:

$$m = \frac{1}{M} \sum_{i=1}^{M} v_i$$

The position pointed at by $m_{n-1}$ determines the starting point around which further positions are checked in the frame n. An area SA={[±x*,±y*]} is defined, around the position indicated by $m_{n-1}$. The points where the MAD has to be checked are set spatially closer in the SA area, and more sparsely outside. Let $p_{nx}(nx_i)$ and $p_{ny}(ny_i)$ be the probability distribution of the noise vectors along the horizontal and vertical direction. The two values x*,y* are determined solving the following integral:

$$\int_{\mu_{p_{nx}}}^{x^*} p_{nx}(nx_i) dnx_i = \frac{s}{2} \quad \int_{\mu_{p_{ny}}}^{y^*} p_{nx}(ny_i) dny_i = \frac{s}{2} \quad (3)$$

according to the detail of probability s we want to have to find the minimum in a certain area.

Once the value of c that better fits the probability distribution of the model in (2) is determined, then the analytical expression of $p_n(n_1)$ will be available, that thanks to its symmetry can be integrated just in one direction. The value of the integral gives the probability that we want to have to get the minimum in the zone.

Considering the Gaussian case as an extreme case of the model, if the target is to check in a more detailed way the area where the probability to find the minimum is 70%, then x*=$\sigma_x$, y*=$\sigma_y$.

Within the search area SA, the points to be checked (block match has to be performed) are set along a two pixels resolution grid. Outside the area SA, the other points to be checked are set at a distance of x*, y* along the horizontal and vertical directions, up to respectively kx*, ky* (k=2,3), where k is anyway fixed by the size of the search window.

FIG. 3a shows a grid of squares representing a general search window of the size +/−14 pixels in the x direction and +/−7 pixels in the y direction. Each line crossing represents one pixel. The central part including 15 dots in this example is the search area SA corresponding to x*=4 and y*=2. Each dot represents the position of the macroblock (any fixed reference point in a macro block such as the center, the upper left corner, etc.) when the MAD is going to be calculated according to formula 1. Thus, the correlation between the macro block in that position and the macro block in the current frame will be calculated. The lower the value of the MAD the better is thus the correlation.

If one of the inner check points of the area SA indicates a minimum for the MAD, calculated according to the formula 1, the motion vector is found by a 1-step search around this point (8 pixel positions checked). If there is no minimum within the SA area, then the direct neighbours of the first minimum are checked at 2 pixels resolution (see FIG. 3b). This type of search is iterated until the minimum is found at the center. Then, as before, a 1-step search around this point gives the motion vector.

By adapting the search strategy to the data it is clear at this stage that this algorithm has less risk to be trapped in a local minimum compared to other non full-search methods.

FIG. 2 shows a flowchart for the SSA (Statistical Search Algorithm) according to the invention. There are thus two main inputs for the algorithm. One is the mean motion vector for the previous frame and the other is the target probability to find the minimum in the search area SA. The search area is defined as a rectangle of dimentions 1/x*, 1/y* (cf. description to FIG. 3). When we have the target probability we can determine the search area and the points to be checked are set along a two pixels resolution grid within the search area SA. Outside the search area the points to be checked are set at a distance of x*, y* along the horizontal and vertical directions up to a certain number fixed by the size of the search window.

Once we have this certain pattern of points in which the match must be checked we can determine whether the best match is within the SA area or outside the same. If the best match is within the SA area only the eight neighbouring pixels are checked in the flowchart box 201 and then the algorithm stops. If on the contrary the best match is found to be outside the SA area then the direct neighbours of the first minimum are checked at two pixels resolution in flowchart box 202, as also shown in FIG. 3. If a minimum is found at the center then again the eight neighbouring pixels are checked in the flowchart box 201 and the search stops. If on the other hand the minimum is not found at the center the algorithm makes a loop back to the flowchart box 202.

Subsampling of the Macroblock

When a block matching must be performed between two frames, the matching criterion is usually evaluated using every pixel of the block. Since the block matching is based on the idea that all the pixels in a block move by the same amount, a good estimation of the motion could be obtained, in principle, by using only a fraction of the pixels in a block. It is evident anyway that if too few pixels are used to get this match, then there will be an inaccuracy in the motion estimates.

In choosing a sub-sampling pattern according to the following a basic consideration has been taken into account. Since the block matching is an operation well devoted to a parallel implementation, and SIMD instruction sets are now present in almost every general purpose processor, the sub-sampling pattern should exploit the SIMD concept.

In FIG. 4 the pattern considered is shown. The choice of the pattern has been made considering a 16×16 pixels block that represents a macro block MB in an MPEG encoder. The pixels considered are just one fourth of the total. The pixels themselves are grouped together in a number of 8, in order to fully exploit the SIMD possibilities. In this case the total block matching operation can be speeded-up according to the processing characteristics of the SIMD instructions, even though some time must be spent in order to prepare the data into the SIMD registers. Another benefit comes from the fact that we are considering just one fourth of the pixels. Since it is possible to load directly from the memory 8 adjacent pixels (coded as unsigned char) into a 64 bit SIMD register, also the number of memory accesses is decreased. Memory accesses represent in fact an important issue in an MPEG encoder and decoder, in particular considering the additional effect due to the usage of multimedia instructions.

Results

The results of the quality performance of the algorithm are presented in terms of PSNR (Peak Signal/Noise Ratio). The original sequences are MPEG2 encoded at a constant bitrate. Consequently the quality of the encoded bitstream is directly affected by the precision of the motion estimation algorithm used. A poor estimation determines in fact a bigger prediction error that must then be coded and transmitted. The MPEG Software Simulation Group version of the MPEG2 encoder has been considered. The 12 frame GOP IBBPBBPBBPBB has been used and the amplitude of the search window for the P frames in case of CCIR 601 sequences has been fixed to +/−32 pixels horizontal and +/−16 pixels vertical. In case of CIF sequences, for the P frames, the search window has been fixed to +/−16 pixels horizontal and +/−7 pixels vertical. For the B frames, in case of forward or backward prediction, the amplitude of the search window has been adequately scaled, according to the values assigned for the P frame case.

Figure 5:
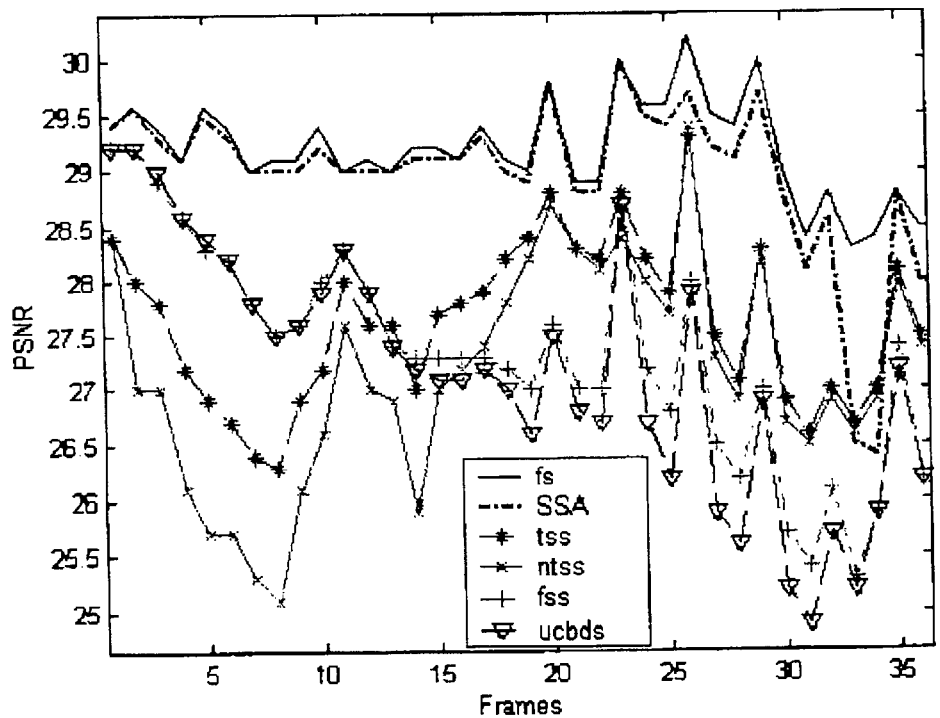
FIG. 5 shows the results of the PSNR (Peak Signal/Noise Ratio) of the standard sequence Stefan (CIF) (Common Interchange Format), encoded at 1.1 Mbit/sec.

In FIG. 5 is shown the results of the PSNR of the standard sequence Stefan (CIF), encoded at 1.1 Mbit/sec.

Figure 6:
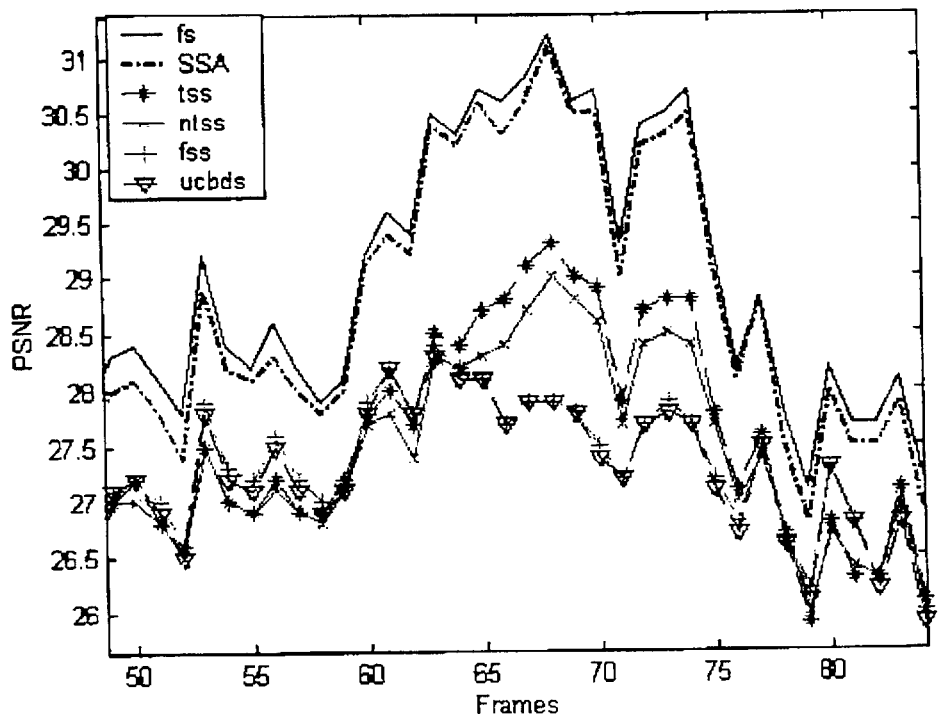
FIG. 6 shows the results for the standard sequence Flower Garden (CCIR 601) encoded at 4 Mbit/s.

FIG. 6 shows the results for the standard sequence Flower Garden (CCIR 601) encoded at 5 Mbit/s.

Table 1 summarises the quality results for the different sequences and as we can see from the results the SSA algorithm according to the invention gives always a better result if compared to the previously known algorithms ntss, tss, fss or ucbds. For the very static sequences, no matter which algorithm is used, the differences are very subtle. If, on the other hand, there is a considerable motion in the sequence, like in Stefan, Flower Garden and Basket, the difference can be noticeable, in particular when the motion starts to become significant. The value of the PSNR in table 1 is indeed an averaged value of the PSNR over the sequence considered. In case of a sudden acceleration of the motion in the sequence, generally the main cause of an immediate drop in the quality, the SSA algorithm immediately adapts to the new situation avoiding very annoying quality degradation that can reach 3 or 4 dB, as is happening for the previously known algorithms.

What is claimed:

1. A method of block matching motion estimation in digital video sequences, comprising the steps of:
   accepting at a encoder a first input signal representing a current image frame and a second input signal representing a reference image frame; and
   in the encoder,
   dividing the current image frame and the reference image frame each into plural blocks of a general rectangular shape;
   for each block of the current image frame, searching the reference frame for a corresponding block;
   calculating a motion vector representing a position difference between each of the blocks of the current frame and the corresponding blocks of the reference frame;
   determining a mean motion vector for one block of the reference frame;
   establishing a search window based on a horizontal displacement and a vertical displacement of the one block;
   from the motion vector calculating step, determining a mean absolute difference of the motion vector of the one block;
   determining a target probability of finding a minimum of the mean absolute difference searching within the search area and outside the search area, within the search window;
   determining whether the minimum of the mean absolute difference is within the search area or outside the search area; and
   locating the minimum of the mean absolute difference and outputting from the encoder a displacement estimation signal.

2. The method of claim 1, wherein the step of finding a minimum of the mean absolute difference within the search window includes the step of establishing points to be checked according to a variance of the motion vector population.

3. The method of claim 2, wherein the step of finding the minimum of the mean absolute difference begins at the mean motion vector for the one block of the reference frame.

4. The method of claim 3, wherein the establishing points to be checked step sets points spatially closer to the mean motion vector of the one block and spatially sparser remote from the mean motion vector of the one block.

5. The method of claim 4, wherein an area for establishing points to be checked at the spatially closer distance is determined by noise vectors along horizontal and vertical directions.

6. A digital video sequence encoder:
   a displacement encoder (2) having a first input for connection to a current frame signal source;
   a reference frame storage circuit (3) having an output connected to a second input of said displacement encoder; and
   a motion compensated predictor circuit (7) having an input connected to an output of said displacement encoder,
   said first input for accepting a first input signal representing a current image frame from the current frame signal source,
   said second input for accepting a signal representing a reference image frame from said reference frame storage circuit,
   the displacement encoder configured for
      dividing the current image frame and the reference image frame each into plural blocks of a rectangular shape,
      for the plural blocks of the current image frame, searching the reference frame for corresponding blocks,
      calculating a motion vector representing a position difference between each of the plural blocks and the corresponding blocks of the reference frame,
      determining a mean motion vector for one block of the reference frame,
      establishing a search window based on a horizontal displacement and a vertical displacement of the one block,
      from the motion vector calculating step, determining a mean absolute difference of the motion vector of the one block, determining a target probability of finding a minimum of the mean absolute difference searching within the search window and outside the search window, determining whether the minimum of the mean absolute difference is within the search window or outside the search window, and locating the minimum of the means absolute difference and outputting at the output of the displacement encoder a displacement estimation signal to the input of the motion compensated predictor circuit.

7. The encoder of claim 6, wherein the displacement encoder is configured to find a minimum of the mean absolute difference with the search window by establishing points to be checked according to a variance of the mean absolute difference.

8. The encoder of claim 7, wherein the displacement encoder is configured to find the minimum of the mean absolute difference by searching first at the mean motion vector for the one block of the reference frame.

9. The encoder of claim 8, wherein the displacement encoder is configured to establish points to be checked by setting points spatially closer to the mean motion vector of the one block and spatially sparser remote from the mean motion vector of the one block.

10. The encoder of claim 9, wherein the displacement encoder determines an area for establishing points to be checked at the spatially closer distance by noise vectors along horizontal and vertical directions.

* * * * *